United States Patent

Burger

[11] 4,014,181
[45] Mar. 29, 1977

[54] AIR CONDITIONING METHODS AND APPARATUS

[76] Inventor: Manfred Rolf Burger, Wolfratshauser Strasse 45/I, 8023 Pullach, Germany

[22] Filed: Oct. 22, 1975

[21] Appl. No.: 624,893

[30] Foreign Application Priority Data

Nov. 5, 1974 Germany .......................... 2452508
May 23, 1975 Germany .......................... 2522967

[52] U.S. Cl. ................................ 62/114; 62/292; 62/243
[51] Int. Cl.² ........................................ F25B 45/00
[58] Field of Search ............ 62/114, 115, 243, 292

[56] References Cited

UNITED STATES PATENTS

| | | | |
|---|---|---|---|
| 1,920,845 | 8/1933 | Dantsizen | 62/114 |
| 2,181,854 | 11/1939 | Anderson et al. | 62/292 |
| 2,273,213 | 2/1942 | McCloy | 62/292 |
| 2,499,170 | 2/1950 | Shoemaker | 62/292 |
| 3,232,070 | 2/1966 | Sparano | 62/292 |
| 3,277,659 | 10/1966 | Sylvan et al. | 62/114 |

*Primary Examiner*—Lloyd L. King
*Attorney, Agent, or Firm*—Larson, Taylor and Hinds

[57] ABSTRACT

Closed-circuit cooling processes, and apparatus for performing such processes, in which a working fluid is successively compressed, condensed through the removal of heat, expanded, and vaporised by take-up of heat from a fluid to be cooled, before being again compressed, the working fluid having been obtained by mixing refrigerant, having a boiling point within the range 0° to 60° C at atmospheric pressure, with air having a partial pressure initially, that is prior to use and throughout at least a major part of the volume of the circuit, of at least 0.05 atmospheres absolute.

13 Claims, 1 Drawing Figure

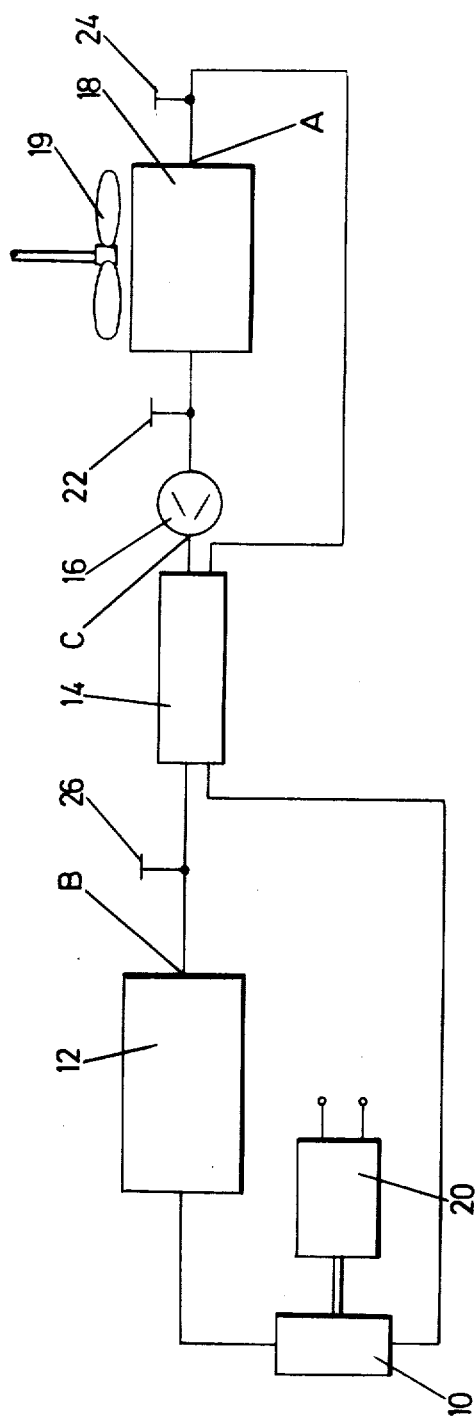

AIR CONDITIONING METHODS AND APPARATUS

The present invention relates to closed-circuit cooling processes, and apparatus for performing such processes, in which a refrigerant is successively compressed, condensed through the removal of heat, expanded, and vaporised by take-up of heat from a fluid to be cooled, before being again compressed.

Hitherto, before charging such apparatus with the refrigerant, all foreign gases have been removed by evacuation of the entire circuit to give a vacuum of less than 1 Torr, i.e. less than 0.002 atmospheres absolute. Not only has this allowed improved thermodynamic efficiency, but it has ensured that no water vapour is present. Water vapour would freeze, and block the apparatus, with use of a low boiling point refrigerant such as $CF_2Cl_2$ or $CHF_2Cl$, whose boiling points lie at $-29.8°$ and $-40.8°$ C respectively. However, a major disadvantage has been that obtaining such high evacuation in the apparatus, whether at its initial charging or during routine maintenance or repair, requires a special installation and highly qualified specialist personnel.

According to one aspect of the present invention, a closed-circuit cooling process of the kind described uses a working fluid which has been obtained by mixing refrigerant, having a boiling point within the range $0°$ to $60°$ C at atmospheric pressure, with air having a partial pressure initially, that is prior to use and throughout at least a major part of the volume of the circuit, of at least 0.05 atmospheres absolute.

According to another aspect of the present invention, in apparatus for performing a cooling process of the kind defined above, the working fluid circulates successively through a compressor, a condenser, an expansion restrictor, and an evaporator.

In contrast to all of the prior art, the present invention allows refrigerant to be charged into the closed circuit without it being necessary previously to remove therefrom, by use of special equipment, all of the air and its attendant water vapour. Indeed, that air with which the refrigerant is mixed is preferably initially at atmospheric pressure and has ambient values of both temperature and water content. However, it is to be understood that the present invention covers arrangements in which some of the air has been removed to give a partial pressure of down to 0.05 atmospheres absolute, as this degree of evacuation can be achieved quite readily by using non-specialist equipment, such as an inlet manifold of a motor vehicle. Even so, the amount of air remaining in the circuit at this lower limit of the scope of the present invention, is far in excess of that which known apparatus has allowed to be present. Installation of apparatus according to the invention, for example into a motor vehicle, and maintenance and repair, can therefore be undertaken at conventional petrol filling stations and motor repair works.

Use of a "high" boiling point refrigerant, such as $CFCl_3$ or $C_2Cl_3F_3$, with boiling points of $23.7°$ and $47°$ C respectively, is not in itself disadvantageous when the fluid to be cooled is air taken directly from a space to be air conditioned, and thereafter delivered back into that space. This is because a cooling of the circulated air to a temperature significantly below $20°$ C could lead to damage to the health of any people in the space to be air conditioned. It should be noted that such "high" boiling point refrigerants can be used because their boiling points are in fact depressed by the partial vacuum which is produced on the intake (suction) side of the compressor.

Preferably, the working fluid is warmed between its exit from the evaporator and its entry to the compressor. Such warming can, for example, take place in a counter-current heat exchanger arranged such that one flow therethrough is liquid working fluid passing from the condenser to the expansion restrictor, and the other flow therethrough is vapour-phase working fluid passing from the evaporator to the compressor. An important practical aspect of this preferred embodiment of the present invention is that the presence of air in the apparatus has been found to lead to merely a negligible decrease in the mechanical efficiency of the compressor.

Also, preferably, the compressor is a rotary piston compressor, and the working fluid further includes a lubricating and sealing oil which is compatible with the refrigerant. Oxidation of the sealing and lubricating oil, possibly arising by the oxygen in the air, is not significant, because the oil can be renewed at regular intervals of time in conjunction with usual maintenance procedure, without great effort and cost. There are, however, two major advantages in allowing the oil to circulate through the refrigerant circuit.

One advantage is that the possibility of corrosion of the apparatus by the water vapour present in the air is prevented by the oil, which forms a fine film on the inner walls of the apparatus. Hardening of this film in the evaporator is easily dealt with by reducing the heat supply to the evaporator, during occasional short periods, to an extent such that liquid refrigerant flows through the evaporator and carries the oil residues away therefrom. In this way, a self-cleaning of the apparatus can be brought about.

A second advantage is that, because the rate of cooling of the total oil present rises with the rotary speed of the compressor, and thus with the cooling output of the apparatus, but on the other hand the rate of frictional heating of the compressor likewise rises with its rotary speed, a self-regulation is achieved which produces a substantially constant viscosity of the lubricating and sealing oil. In the evaporator, and on the way from the evaporator to the rotary piston compressor, the sealing and lubricating oil gives up heat to the refrigerant.

It has appeared that apparatus according to the present invention can be used for air conditioning of medium and small size motor vehicles. Indeed, with apparatus according to the present invention it is possible to drive the compressor with an electric motor, which can be fed from the vehicle's own electrical supply, without the electrical supply of the remainder of the vehicle being adversely affected. Alternatively, the compressor can be driven directly from the vehicle's transmission, or through a belt drive connected to the rotor of the vehicle's alternator. It is also considered likely that apparatus according to the present invention will be installed in houses, and other buildings, to form part of air conditioning systems therefor.

The invention will be explained below with reference to an apparatus shown schematically in the accompanying drawing.

The accompanying drawing shows schematically an air conditioning apparatus, preferably for use in motor vehicles. In the drawing, a rotary piston compressor is indicated at 10, to the pressure side of which there are connected in series as follows, each joined together by conduits, a condenser 12, a counter-current heat exchange 14, an expansion nozzle 16, and an evaporator 18. A fan 19 blows air to be cooled past the evaporator 18. A return conduit leads from the outlet A of the evaporator 18 through the counter-current heat exchanger 14 back to the suction side of the rotary piston compressor 10.

The rotary piston compressor 10, sealed with oil, satisfies the operating requirements of a high boiling point refrigerant such as $CFCl_3$, namely a large volume throughput with a pressure up to about 2 atmospheres gauge on the pressure side, and a vacuum down to about 360 Torr on the suction side of the compressor.

The rotor of the rotary piston compressor 10 is driven by an electric motor 20, with which it is in permanent driving connection. The electric motor can be driven from the vehicle's own current supply through an alternator. Alternatively, the compressor 10 can be driven directly from the vehicle's transmission, or through a belt drive connected to the rotor of the vehicle's alternator. It should be noted that the rotary speed of the electric motor 20, constituting a drive according to the present invention, is capable of varying in use within the range 1:7. This variation can be obtained by use of a speed regulator, of either manual or automatic operation, to match the volume throughput in the refrigerant circuit with the external operating conditions. For further improvement of the efficiency, the rotary piston compressor 10 can be water-cooled. A pump for this water cooling can be driven either from the crankshaft of the motor vehicle, or directly from the shaft of the rotary piston compressor 10.

A switch, located inside the motor vehicle, is preferably provided for allowing the electric motor 20 to be stopped during periods when air conditioning is not required. This prolongs the life of the compressor, yet avoids the need for expensive clutch arrangements if the compressor is driven from the transmission.

The charging of the apparatus shown preferably takes place as follows: first the evaporator 18 is separated from the remainder of the apparatus by shut-off means 22 and 24 arranged respectively directly upstream and downstream of the evaporator. Thereafter the evaporator 18 is filled with liquid refrigerant. Assuming the correct dimensioning of the evaporator 18 for the desired cooling output of the apparatus, a sufficient quantity of refrigerant is present in the apparatus in all cases, if the evaporator is filled fully with liquid refrigerant. If the apparatus is provided with a refrigerant reservoir (not shown), which can be separated by shut-off means from the remainder of the apparatus, the filling of the refrigerant into the apparatus can take place in the same manner through this refrigerant reservoir. The reservoir, if present at all, is preferably located in the circuit between the outlet B of the condenser 12 and the inlet C to the expansion nozzle 16. For filling the refrigerant into the evaporator or into the refrigerant reservoir, no special preparations are necessary because the evaporator 18, or the reservoir, need neither be evacuated nor dried.

The remainder of the apparatus is at first in connection with the external air through an opening which can be shut off, for example a valve 26, so that the apparatus, with the exception of the part of the apparatus lying between the shut-off means 22 and 24, is filled with air. Clearly, the air will be at about 1 atmosphere absolute pressure, and have ambient values of both temperature and water content. If necessary, however, the air pressure can be reduced to the value mentioned hereinbefore.

After closing the valve 26, the shut-off means 22 and 24 are opened, so that refrigerant flows out of the evaporator 18 into the other parts of the apparatus until the air present in the apparatus is saturated with refrigerant vapour. Then the apparatus is ready for operation.

Alternatively, the filling of the apparatus can occur in the following way, still without any need for specialised equipment. With slow running of the rotary piston compressor 10, a mixture of liquid refrigerant and sealing and lubricating oil is introduced through the valve 26 into the apparatus, which again is not evacuated but rather is filled with normal atmospheric air.

On installation of the apparatus, one would generally arrange the condenser 12 in front of the vehicle radiator, and put the compressor 10 in the vehicle's engine compartment. The evaporator 18 can be so constructed that either it is influenced directly by the air from the vehicle compartment which is to be cooled, or it is connected through a subsidiary heat exchanger to the vehicle's usual heating system.

I claim:

1. In a closed-circuit cooling process in which a working fluid is successively compressed, condensed through the removal of heat, expanded, and vaporized by take-up of heat from a fluid to be cooled, before being again compressed, the improvement comprising the steps of providing a working fluid by mixing a refrigerant, having a boiling point within the range 0° to 60° C at atmospheric pressure, with air having a partial pressure prior to use and throughout at least a major part of the volume of the circuit, of not less than 0.05 atmospheres absolute.

2. A process according to claim 1, in which the refrigerant was intially poured as a liquid into a part only of the circuit which sealed from the remainder of said circuit.

3. A process according to claim 1, in which the air was initially at atmospheric pressure and at ambient temperature.

4. A cooling apparatus comprising:
a closed working fluid circuit, a working fluid in the circuit including a refrigerant having a boiling point within the range of 0° to 60° C at atmospheric pressure, said circuit including, in series, a compressor, a condenser and fluid vaporization means, and including means for initially charging the circuit by substantially filling the circuit with air at a pressure of not less than 0.05 atmospheres absolute, and mixing said air with said refrigerant.

5. Apparatus according to claim 4, in which the working fluid also comprises a lubricating and sealing oil which is compatible with the refrigerant.

6. Apparatus according to claim 4, in which a counter-current heat exchanger is arranged such that one flow therethrough is liquid working fluid passing from the condenser to the expansion restrictor, and the other flow therethrough is vapour-phase working fluid passing from the evaporator to the compressor.

7. Apparatus according to claim 4, in which the compressor is a rotary piston compressor.

8. Apparatus according to claim 7, in which the rotary piston compressor is powered by a drive, the rotary speed of which can be varied within the range of 1:7.

9. Apparatus according to claim 7, in which the rotary compressor is in permanent driving connection with a drive therefor.

10. Apparatus according to claim 7, in which the rotary piston compressor is powered by a drive in the form of an electric motor.

11. Apparatus according to claim 10, in which the electric motor is itself powered by an alternator of a motor vehicle.

12. Apparatus according to claim 4, in which the evaporator can be sealed from the remainder of the circuit.

13. A motor vehicle comprising air conditioning apparatus of the construction defined in claim 4.

* * * * *